(12) United States Patent
Zhou et al.

(10) Patent No.: US 11,664,869 B2
(45) Date of Patent: May 30, 2023

(54) TECHNIQUES FOR REPORTED RESOURCE INDICATOR AND MAXIMUM RESOURCE NUMBER FOR SIGNAL-TO-INTERFERENCE-AND-NOISE RATIO (SINR) IN A WIRELESS COMMUNICATION SYSTEM

(71) Applicant: QUALCOMM Incorporated, San Diego, CA (US)

(72) Inventors: Yan Zhou, San Diego, CA (US); Hamed Pezeshki, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/226,415

(22) Filed: Apr. 9, 2021

(65) Prior Publication Data

US 2021/0320702 A1 Oct. 14, 2021

Related U.S. Application Data

(60) Provisional application No. 63/008,518, filed on Apr. 10, 2020.

(51) Int. Cl.
*H04B 7/06* (2006.01)
*H04L 5/00* (2006.01)
(Continued)

(52) U.S. Cl.
CPC ......... *H04B 7/0626* (2013.01); *H04B 17/336* (2015.01); *H04L 5/0051* (2013.01); *H04W 24/10* (2013.01); *H04W 56/001* (2013.01)

(58) Field of Classification Search
CPC ... H04B 7/0626; H04B 17/336; H04L 5/0051; H04W 24/10; H04W 56/001
See application file for complete search history.

(56) References Cited

U.S. PATENT DOCUMENTS

2020/0145995 A1\* 5/2020 Abdel Shahid ....... H04L 5/0094
2020/0235832 A1\* 7/2020 Lee .................... H04L 27/2613
(Continued)

FOREIGN PATENT DOCUMENTS

WO WO-2020207269 A1 \* 10/2020
WO WO-2022175892 A1 \* 8/2022
WO WO-2022249740 A1 \* 12/2022

*Primary Examiner* — Deepa Belur
(74) *Attorney, Agent, or Firm* — Arent Fox, LLP

(57) ABSTRACT

The present disclosure relates to reported channel state information (CSI) reference signal (RS) resource indicator (CRI)/synchronization signal block resource indicator (SSBRI) and maximum resource number for Layer 1 signal-to-interference-and-noise ratio (SINR). In one aspect, a user equipment (UE) may receive a CSI report configuration that includes a report quantity parameter set to indicate use of a SINR, obtain an SINR measurement, and transmit a CSI report including the SINR measurement to the network entity. In another aspect, a network entity may transmit a CSI report configuration that includes a report quality parameter set to indicate use of a SINR, the report quantity parameter is configured to trigger the UE to measure the SINR of at least one communication channel associated with the network entity, and receive a CSI report including an SINR measurement from the UE.

30 Claims, 7 Drawing Sheets

(51) Int. Cl.
*H04W 56/00* (2009.01)
*H04B 17/336* (2015.01)
*H04W 24/10* (2009.01)

(56) References Cited

U.S. PATENT DOCUMENTS

2022/0190977 A1* 6/2022 Lee .................. H04B 17/318
2022/0322361 A1* 10/2022 Zhu .................. H04L 5/0048

* cited by examiner

TECHNIQUES FOR REPORTED RESOURCE INDICATOR AND MAXIMUM RESOURCE NUMBER FOR SIGNAL-TO-INTERFERENCE-AND-NOISE RATIO (SINR) IN A WIRELESS COMMUNICATION SYSTEM

CROSS-REFERENCE TO RELATED APPLICATION(S)

This application claims the benefit of U.S. Provisional Patent Application No. 63/008,518, entitled "TECHNIQUES FOR REPORTED RESOURCE INDICATOR AND MAXIMUM RESOURCE NUMBER FOR SIGNAL-TO-INTERFERENCE-AND-NOISE RATIO (SINR) IN A WIRELESS COMMUNICATION SYSTEM" and filed on Apr. 10, 2020, which is expressly incorporated by reference herein in its entirety.

BACKGROUND

Aspects of the present disclosure relate generally to wireless communication systems, and more particularly, to reported channel state information (CSI) reference signal (RS) resource indicator (CRI)/synchronization signal block resource indicator (SSBRI) and maximum resource number for Layer 1 signal-to-interference-and-noise ratio (SINR).

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

For example, for various communications technology such as, but not limited to NR, some aspects may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication at an apparatus of a user equipment (UE) including receiving a channel state information (CSI) report configuration, from a network entity, that includes a report quality parameter set to indicate use of a signal-to-interference-and-noise ratio (SINR), the report quantity parameter is configured to trigger the UE to measure the SINR of at least one communication channel associated with the network entity. The method may further include means for obtaining an SINR measurement in response to receiving the CSI report configuration with the report quantity parameter set to indicate use of the SINR. The method may further include means for transmitting a CSI report including the SINR measurement to the network entity.

Another aspect of the subject matter described in this disclosure can be implemented in an apparatus for wireless communication. The apparatus may include memory including instructions and a processor in communication with the memory to execute the instructions to receive a CSI report configuration, from a network entity, that includes a report quantity parameter set to indicate use of a SINR, the report quantity parameter is configured to trigger the UE to measure the SINR of at least one communication channel associated with the network entity. The processor may further configured to obtain an SINR measurement in response to receiving the CSI report configuration with the report quantity parameter set to indicate use of the SINR. The processor may further be configured to transmit a CSI report including the SINR measurement to the network entity.

A further aspect of the subject matter described in this disclosure can be implemented in an apparatus for wireless communication. The apparatus may include means for receive a CSI report configuration, from a network entity, that includes a report quantity parameter set to indicate use of a SINR, the report quantity parameter is configured to trigger the UE to measure the SINR of at least one communication channel associated with the network entity. The apparatus may further includes means for obtaining an SINR measurement in response to receiving the CSI report configuration with the report quantity parameter set to indicate use of the SINR. The apparatus may further include means for transmitting a CSI report including the SINR measurement to the network entity.

Another aspect of the subject matter described in this disclosure can be implemented in a non-transitory computer-readable medium including stored instructions of communications, executable by a processor to receive a CSI report configuration, from a network entity, that includes a report quantity parameter set to indicate use of a SINR, the report quantity parameter is configured to trigger the UE to measure the SINR of at least one communication channel associated with the network entity, obtain an SINR measurement in response to receiving the CSI report configuration with the report quantity parameter set to indicate use of the SINR, and transmit a CSI report including the SINR measurement to the network entity.

Another example aspect includes a method of wireless communication at an apparatus of a network entity including transmitting a CSI report configuration, to a UE, that includes a report quality parameter set to indicate use of a SINR, the report quantity parameter is configured to trigger the UE to measure the SINR of at least one communication channel associated with the network entity. The method may further include means for receiving a CSI report including an SINR measurement from the UE.

Another aspect of the subject matter described in this disclosure can be implemented in an apparatus for wireless communication. The apparatus may include memory including instructions and a processor in communication with the memory to execute the instructions to transmit a CSI report configuration, to a UE, that includes a report quantity parameter set to indicate use of a SINR, the report quantity parameter is configured to trigger the UE to measure the SINR of at least one communication channel associated with the network entity. The at least one processor may further be configured to receive a CSI report including an SINR measurement from the UE.

A further aspect of the subject matter described in this disclosure can be implemented in an apparatus for wireless communication. The apparatus may include means for transmitting a CSI report configuration, to a UE, that includes a report quantity parameter set to indicate use of a SINR, the report quantity parameter is configured to trigger the UE to measure the SINR of at least one communication channel associated with the network entity. The apparatus may further include means for receiving a CSI report including an SINR measurement from the UE.

Another aspect of the subject matter described in this disclosure can be implemented in a non-transitory computer-readable medium including stored instructions of communications, executable by a processor to transmit a CSI report configuration, to a UE, that includes a report quantity parameter set to indicate use of a SINR, the report quantity parameter is configured to trigger the UE to measure the SINR of at least one communication channel associated with the network entity, and receive a CSI report including an SINR measurement from the UE.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Like reference numbers and designations in the various drawings indicate like elements.

DETAILED DESCRIPTION

Figure 1:
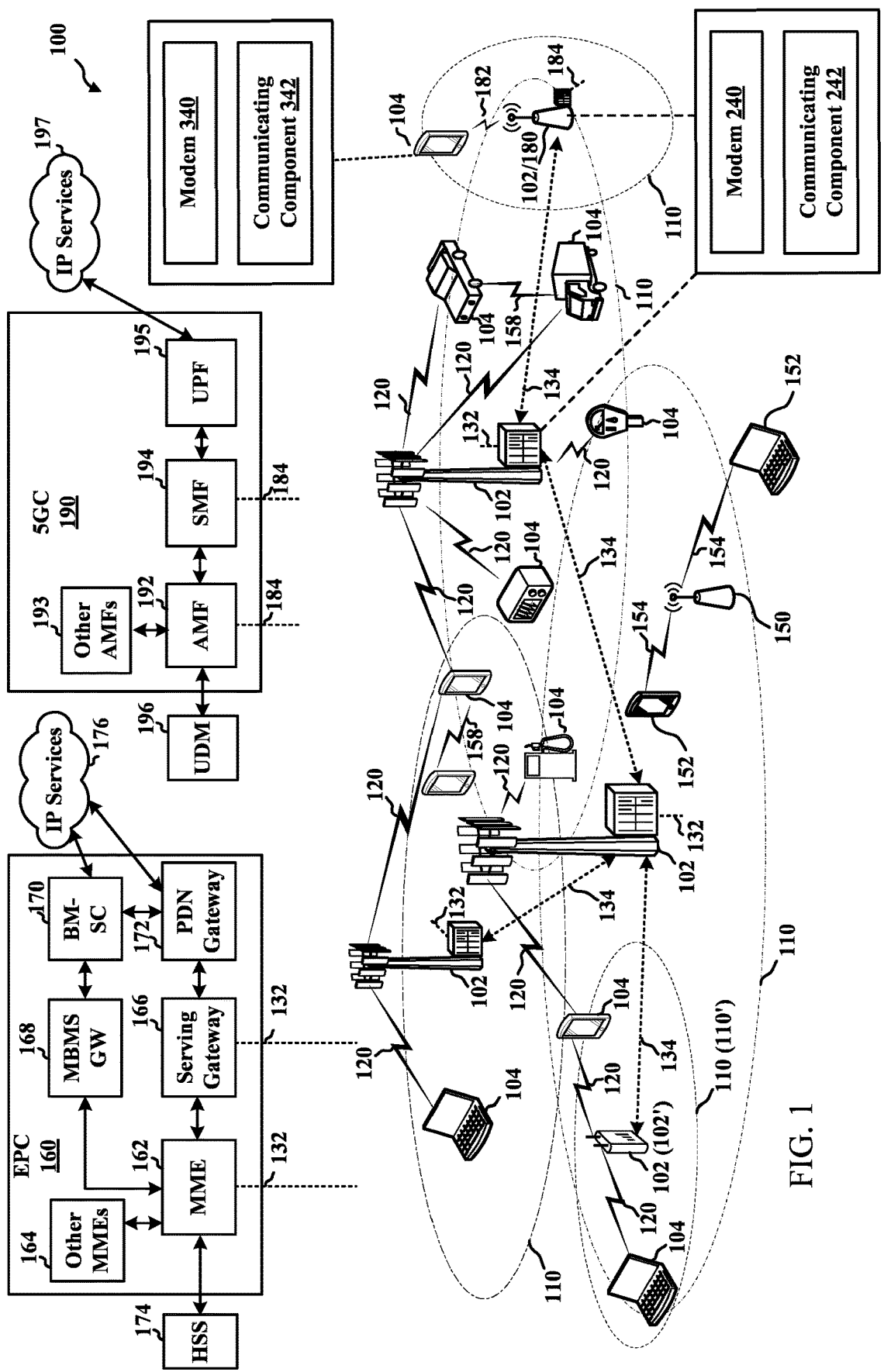
FIG. 1 illustrates an example of a wireless communication system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to a reported channel state information (CSI) reference signal (RS) resource indicator (CRI)/synchronization signal block resource indicator (SSBRI) and maximum resource number for Layer 1 signal-to-interference-and-noise ratio (SINR). Specifically, a user equipment (UE) may be configured to obtain and transmit various channel related measurements to a network entity (e.g., gNB) on a periodic or aperiodic basis. In one example, the UE may receive a CSI report configuration from a network entity that indicates a particular type of measurement for the UE to obtain and transmit back to the network entity. However, current CSI report configurations are limited in that useful measurements may not be requested from the UE. One such measurement may be SINR. For example, SINR, which accounts for both interference and noise on a channel, may be used by the network entity to configure channel measurement resources and provide the network entity with additional information to help manage inter-cell interference.

The present disclosure includes a method, apparatus, and non-statutory computer readable medium for wireless communications at a UE including receiving a CSI report configuration, from a network entity, that includes a report quality parameter set to indicate use of a SINR, the report quantity parameter is configured to trigger the UE to measure the SINR of at least one communication channel associated with the network entity, obtaining an SINR measurement in response to receiving the CSI report configuration with the report quantity parameter set to indicate use of the SINR, and transmitting a CSI report including the SINR measurement to the network entity.

The present disclosure also includes a method, apparatus, and non-statutory computer readable medium for wireless communications at a network entity including transmitting a CSI report configuration, to a UE, that includes a report quality parameter set to indicate use of a SINR, wherein the report quantity parameter is configured to trigger the UE to measure the SINR of at least one communication channel associated with the network entity, and receiving a CSI report including an SINR measurement from the UE.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. or may not include all of the devices, components, modules etc. discussed in connection with the figures. A combination of these approaches also can be used.

FIG. 1 illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells (low power cellular base station). The macro cells can include base stations. The small cells can include femtocells, picocells, and microcells. In an example, the base stations 102 also may include gNBs 180, as described further herein.

In one example, some nodes such as base station 102/gNB 180, may have a modem 240 and communicating component 242 for transmitting a CSI report configuration, to a UE, that includes a report quantity parameter set to indicate use of a SINR, wherein the report quantity parameter is configured to trigger the UE to measure the SINR of at least one communication channel associated with the network entity, and receiving a CSI report including an SINR measurement from the UE, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for including receiving a CSI report configuration, from a network entity, that includes a report quantity parameter set to indicate use of a SINR, the report quantity parameter is configured to trigger the UE to measure the SINR of at least one communication channel associated with the network entity, obtaining an SINR measurement in response to receiving the CSI report configuration with the report quantity parameter set to indicate use of the SINR, and transmitting a CSI report including the SINR measurement to the network entity, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 3:
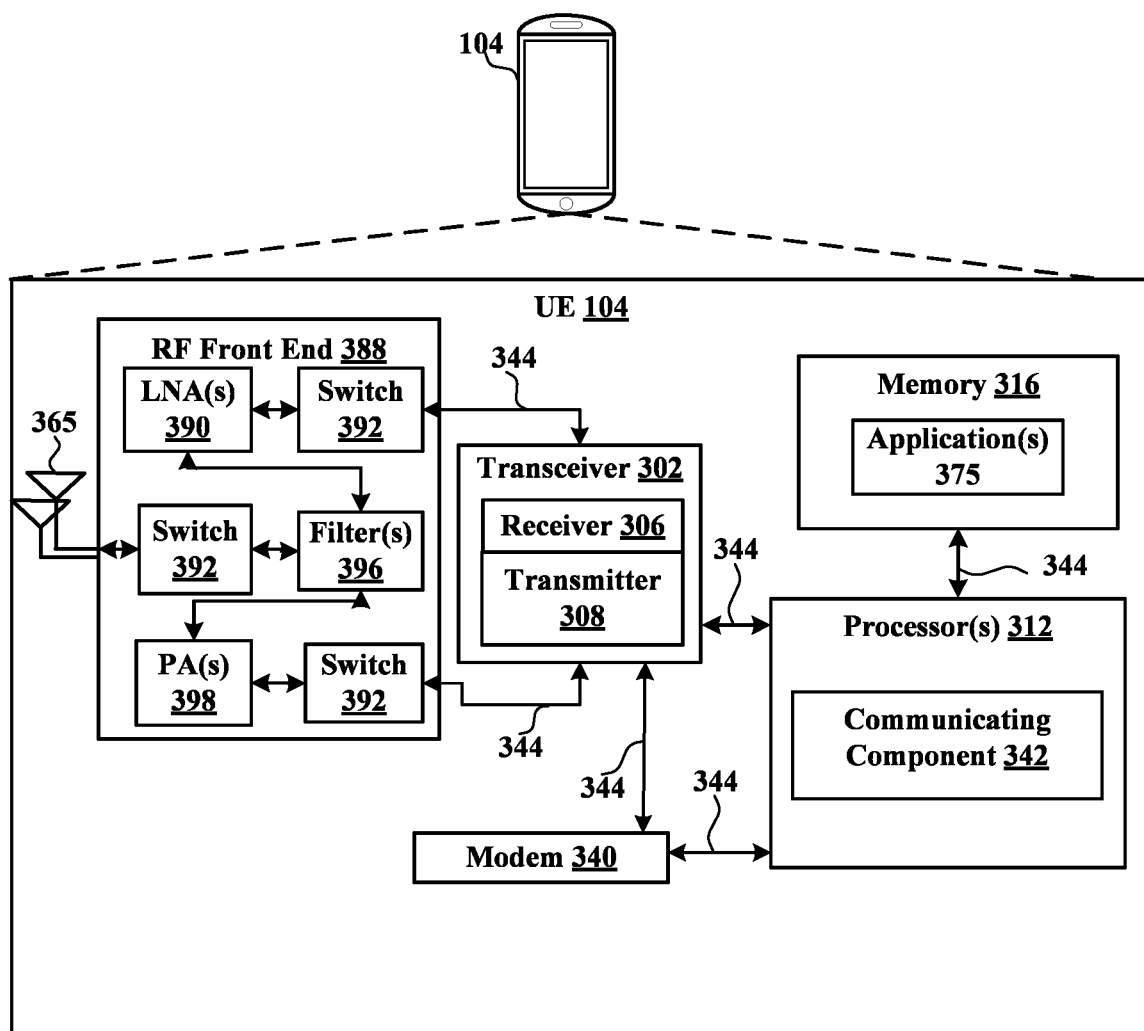
FIG. 3 is a block diagram illustrating an example of a user equipment (UE).
Figure 4:
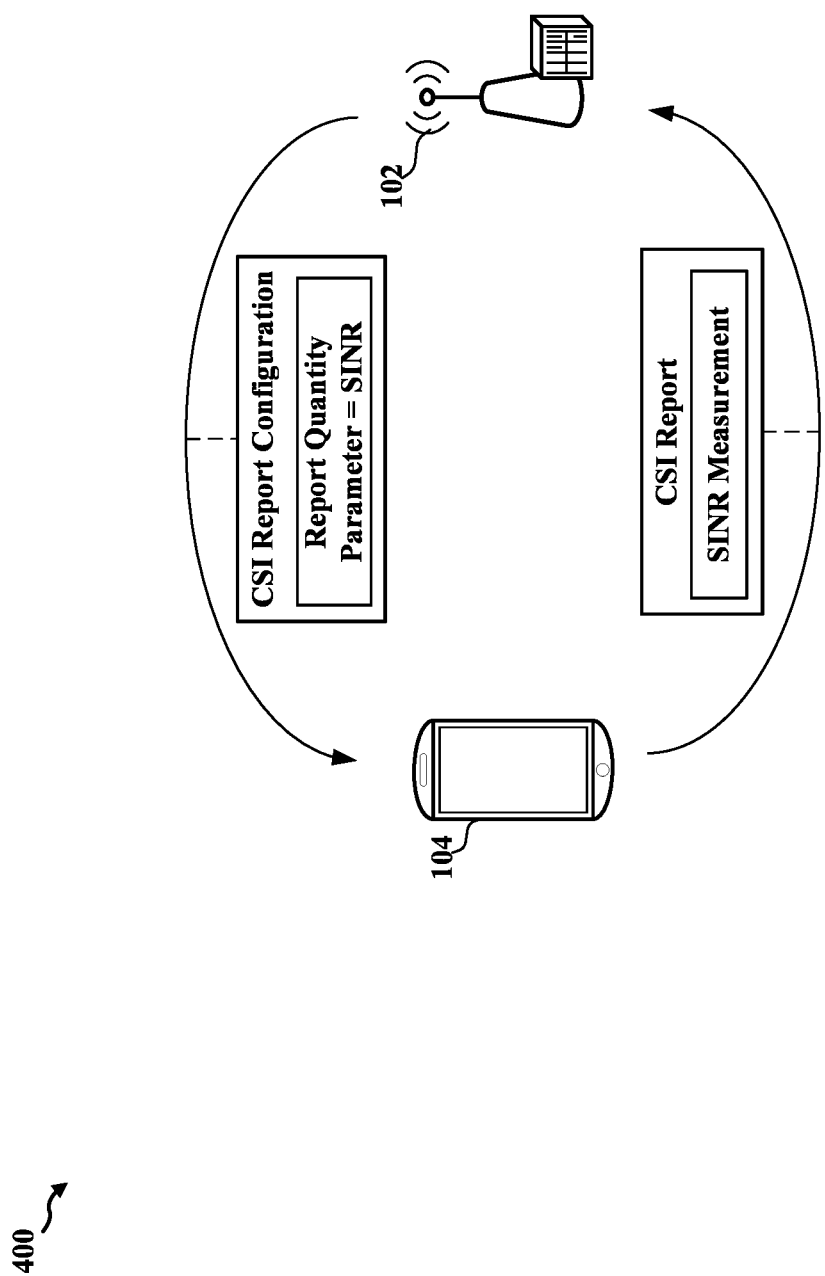
FIG. 4 is an example representation of a channel state information (CSI) report configuration and CSI report communication scheme.
Figure 5:
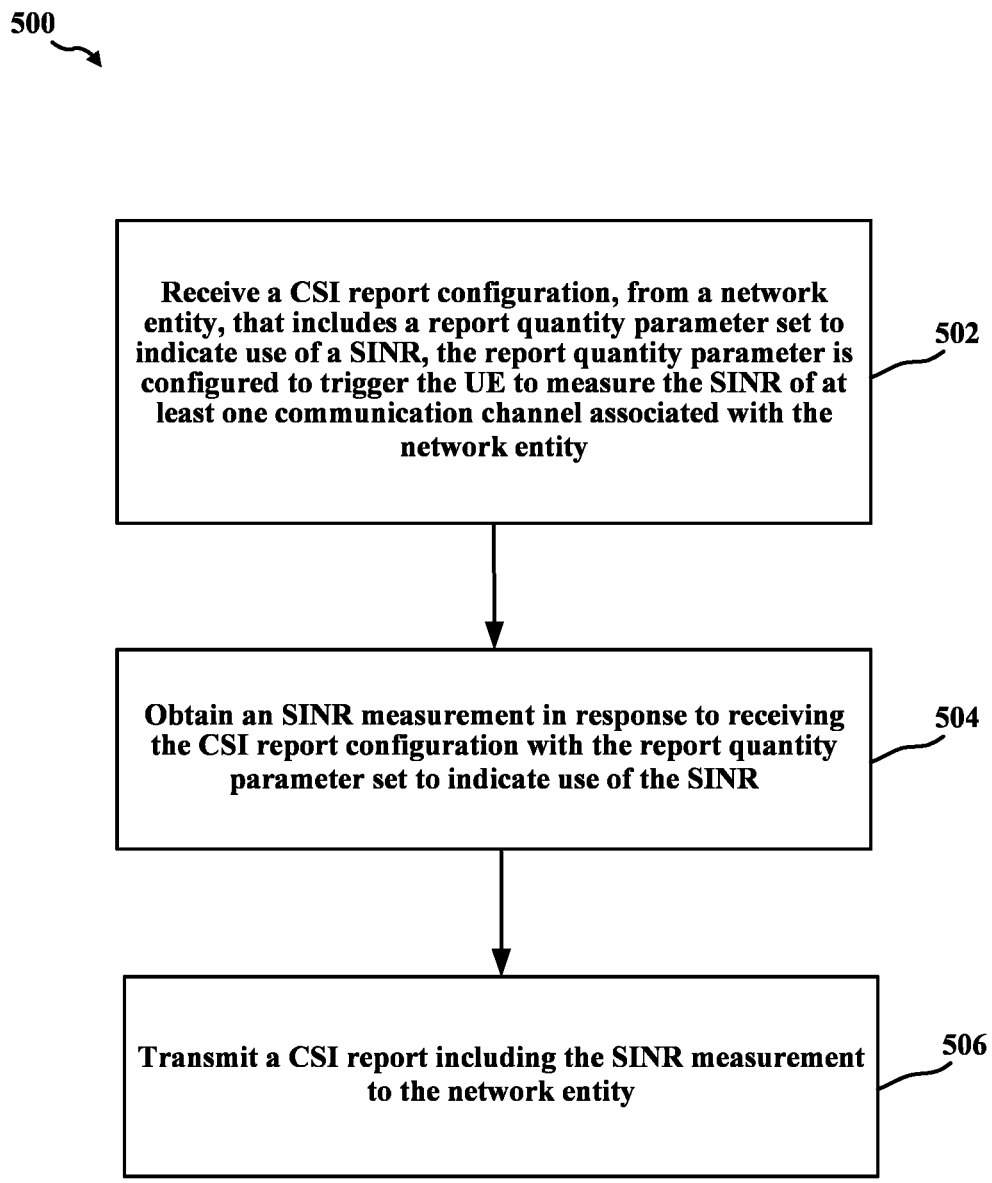
FIG. 5 is a flowchart of an example method of wireless communication at an apparatus of a UE.
Figure 6:
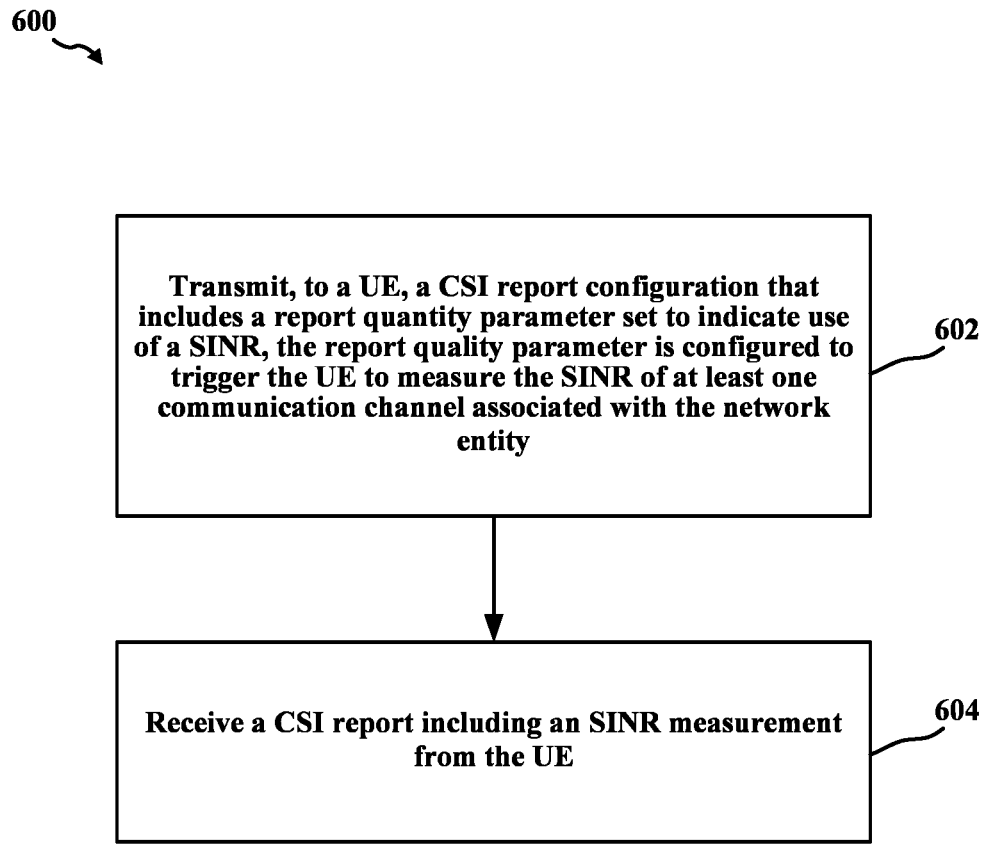
FIG. 6 is a flowchart of another example method of wireless communication at an apparatus of a network entity.

Turning now to FIGS. 2-7, aspects are depicted with reference to one or more components and one or more methods that may perform the actions or operations described herein, where aspects in dashed line may be optional. Although the operations described below in FIGS. 5 and 6 are presented in a particular order or as being performed by an example component, it should be understood that the ordering of the actions and the components performing the actions may be varied, depending on the aspect. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 2:
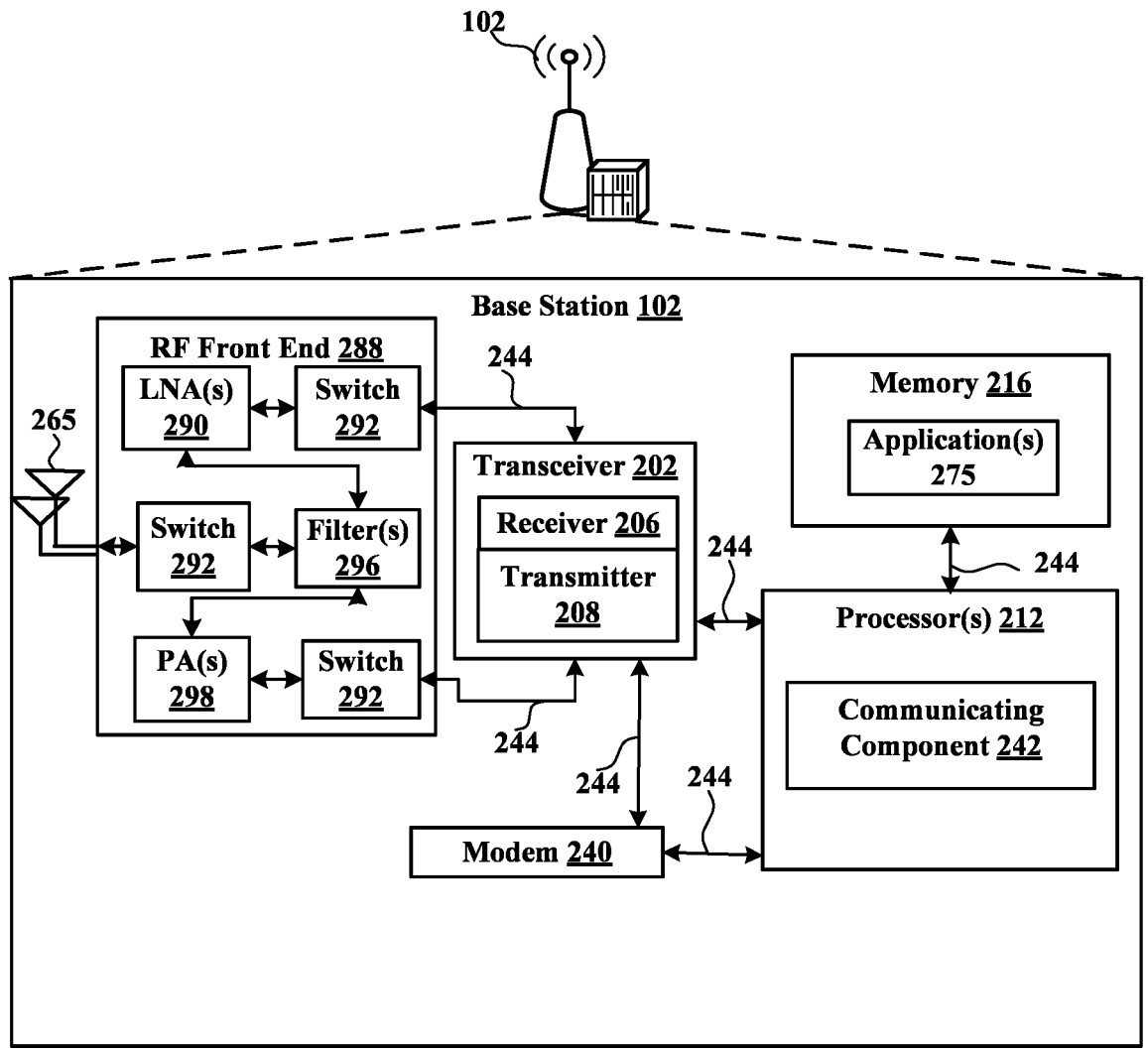
FIG. 2 is a block diagram illustrating an example of a network entity (also referred to as a base station).

FIG. 2 is a block diagram illustrating an example of a network entity (also referred to as a base station). The base station 102 (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242 for reported CRI/SSBRI and maximum resource number for Layer 1 SINR.

In some aspects, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In some aspects, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIGS. 4 and 6. Similarly, the memory 216 may correspond to the memory described in connection with the UE in FIG. 7.

FIG. 3 is a block diagram illustrating an example of a UE 104. The UE 104 may include a variety of components, some of which have already been described above and are described further herein, including components such as one or more processors 312 and memory 316 and transceiver 302 in communication via one or more buses 344, which may operate in conjunction with modem 340.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In some aspects, the processor(s) 312 may correspond to one or more of the processors described in connection with the base station in FIG. 7. Similarly, the memory 316 may correspond to the memory described in connection with the base station in FIG. 7.

FIG. 4 is an example representation of a CSI report configuration and CSI report communication scheme 400. For example, a network entity (e.g., gNB 102) may transmit a CSI report configuration including a report quantity set to an SINR to a UE 104. The CSI report configuration may trigger the UE 104 to perform an SINR measurement according to the aspects described herein.

In one aspect, the CRI/SSBRI definition may be extended to L1-SINR. Specifically, if the reported CRI/SSBRI is index of 'k', which may refer to the (k+1)th entry of configured RS resource in the RS resource set for channel or interference measurement, then the resource settings may be sent through a CSI resource configuration indication (e.g., CSI-ResourceConfig) which can be associated with a CSI report configuration indication (CSI-ReportConfig).

More specifically, if the UE is configured with a CSI-ReportConfig with the higher layer parameter reportQuantity set to 'cri-RSRP', 'cri-SINR', 'cri-RI-PMI-CQI', 'cri-RI-i1', 'cri-RI-i1-CQI', 'cri-RI-CQI' or 'cri-RI-LI-PMI-CQI', and $K\_s>1$ resources are configured in the corresponding resource set for channel measurement, then the UE may derive the CSI parameters other than CRI conditioned on the reported CRI, where CRI k ($k\geq 0$) corresponds to the configured (k+1)-th entry of associated non-zero power (nzp)-CSI-RS-Resource in the corresponding nzp-CSI-RS-ResourceSet for channel measurement, and (k+1)-th entry of associated csi-IM-Resource in the corresponding csi-IM-ResourceSet (if configured). Except for L1-SINR, if $K\_s=2$ CSI-RS resources are configured, each resource may contain at most 16 CSI-RS ports. Except for L1-SINR, if $2<K\_s\leq 8$ CSI-RS resources are configured, each resource may contain at most 8 CSI-RS ports.

Additionally, if the UE is configured with a CSI-ReportConfig with the higher layer parameter reportQuantity set to 'ssb-Index-RSRP' or 'ssb-Index-SINR', the UE shall report SSBRI, where SSBRI k ($k\geq 0$) corresponds to the configured (k+1)-th entry of the associated csi-SSB-ResourceList in the corresponding CSI-SSB-ResourceSet.

In another aspect, a maximum number of configured code mode requests (CMRs) for a L1-SINR report may be 64. Therefore, a UE may not be expected to be configured with more than 64 NZP CSI-RS resources in resource setting for CMR for a L1-SINR report. In addition, a maximum number of CMRs that can be configured for a L1-SINR report may be 64.

Specifically, for a resource setting configuration, a UE may not be expected to be configured with more than one CSI-RS resource in resource set for channel measurement for a CSI-ReportConfig with the higher layer parameter codebookType set to either 'typeII', 'typeII-PortSelection', 'typeII-r16' or to 'typeII-PortSelection-r16'. A UE may not be expected to be configured with more than 64 NZP CSI-RS resources in resource setting for channel measurement for a CSI-ReportConfig with the higher layer parameter reportQuantity set to 'none', 'cri-RI-CQI', 'cri-RSRP', or 'ssb-Index-RSRP' or 'cri-SINR'. If interference measurement is performed on CSI-IM, each CSI-RS resource for channel measurement may be resource-wise associated with a CSI-IM resource by the ordering of the CSI-RS resource and CSI-IM resource in the corresponding resource sets. The number of CSI-RS resources for channel measurement may equal to the number of CSI-IM resources.

Additionally, the limit of max 16 CSI-RS resources in a resource set in the aperiodic resource setting may be applicable to L1-SINR in addition to L1-RSRP. If the UE is configured with a CSI-ReportConfig with higher layer parameter reportQuantity set to 'cri-RSRP', 'cri-SINR', or 'none' and the CSI-ReportConfig is linked to a resource setting configured with the higher layer parameter resourceType set to 'aperiodic', then the UE may not be expected to be configured with more than 16 CSI-RS resources in a CSI-RS resource set contained within the resource setting.

FIG. 5 is a flowchart of an example method 500 of wireless communication at an apparatus of a UE. In an example, a UE 104 can perform the functions described in method 500 using one or more of the components described in FIGS. 1, 3 and 7.

At block 502, the method 500 may receive a CSI report configuration, from a network entity, that includes a report quantity parameter set to indicate use of a SINR, the report quantity parameter is configured to trigger the UE to measure the SINR of at least one communication channel associated with the network entity. In some aspects, the communicating component 342, such as in conjunction with processor(s) 312, memory 316, or transceiver 302, may be configured to receive a CSI report configuration, from a network entity, that includes a report quantity parameter set to indicate use of a SINR, the report quantity parameter is configured to trigger the UE to measure the SINR of at least one communication channel associated with the network entity. Thus, the UE 104, the processor(s) 312, the communicating component 342 or one of its subcomponents may define the means for receiving a CSI report configuration, from a network entity, that includes a report quantity parameter set to indicate use of a SINR, the report quantity parameter is configured to trigger the UE to measure the SINR of at least one communication channel associated with the network entity. For example, to receive the CSI report configuration from the network entity, the processor 312 of the UE 104 may activate the transceiver 302 and associated RF front end 388 components.

In some aspects, the report quantity parameter may be set to indicate use of a cri-SINR.

In some aspects, the report quantity parameter may be set to indicate use of a ssb-Index-SINR.

At block 504, the method 500 may obtain an SINR measurement in response to receiving the CSI report configuration with the report quantity parameter set to indicate use of the SINR. In some aspects, the communicating component 342, such as in conjunction with processor(s) 312, memory 316, or transceiver 302, may be configured to obtain an SINR measurement in response to receiving the CSI report configuration with the report quantity parameter set to indicate use of the SINR. Thus, the UE 104, the processor(s) 312, the communicating component 342 or one of its subcomponents may define the means for obtaining an SINR measurement in response to receiving the CSI report configuration with the report quantity parameter set to indicate use of the SINR. For example, using the CSI report configuration with the report quantity parameter set to indicate use of the SINR, the processor 312 of the UE 104 may, in conjunction with one or more applications 375 residing at the memory 316, obtain the SINR measurement.

At block 506, the method 500 may transmit a CSI report including the SINR measurement to the network entity. In some aspects, the communicating component 342, such as in conjunction with processor(s) 312, memory 316, or transceiver 302, may be configured to transmit a CSI report including the SINR measurement to the network entity. Thus, the UE 104, the processor(s) 312, the communicating component 342 or one of its subcomponents may define the means for transmitting a CSI report including the SINR measurement to the network entity. For example, the processor 312 of the UE 104 may activate the transceiver 302 and associated RF front end 388 components to transmit, to the network entity, the CSI report including the SINR measurement.

The method 500 may further include receiving a resource set including a number of configured CSI RS resources from the network entity, determining that the number of configured CSI-RS resources does not satisfy a port configuration threshold value corresponding to a defined number of configured CSI-RS resources associated with a first port value or a range of configured CSI-RS resources associated with a second port value, and forgoing obtaining the SINR measurement based on determining that the number of configured CSI-RS resources does not satisfy the port configuration threshold value, such that each resource of the number of configured CSI-RS resources includes a third port value for transmitting the CSI report based on determining that number of configured CSI-RS resources does not satisfy the port configuration threshold value.

In some aspects, the port configuration threshold value may correspond to one of two CSI-RS resources, or the range between two configured CSI-RS resources and eight configured CSI-RS resources.

In some aspects, the first port value may correspond to a maximum of sixteen ports and the second port value may correspond to a maximum of eight ports, the third port value different from the first and second port values.

In some aspects, the CSI report configuration including the report quantity parameter set to a CSI reference signal (RS) resource indicator SINR (cri-SINR) is associated with configured non-zero-power (NZP) CSI reference signal (RS) resources in a corresponding NZP-CSI-RS resource set for channel measurement and at least one of: an associated CSI interference management (IM) resource in a corresponding csi-IM resource set, or an associated nzp-CSI-RS resources in a corresponding NZP-CSI-RS resource set for interference management.

In some aspects, the CSI report configuration including the report quantity parameter set to the SINR is associated with a resource limit of 16 CSI RS resources in a resource set of an aperiodic resource setting.

In some aspects, the CSI report configuration including the report quantity parameter set to a ssb-Index-SINR corresponding to a configured entry of an associated csi-SSB resource list in a corresponding CSI-SSB resource set for channel measurement and at least one of: an associated CSI interference management (IM) resource in a corresponding csi-IM resource set, or an associated nzp-CSI-RS resources in a corresponding NZP-CSI-RS resource set for interference management.

The method 500 may further include determining that a CRI corresponding to an index value is associated with an entry iterated by the index value and another value of a configured set of CSI RS resources for channel or interference measurement, wherein the CSI report including the SINR measurement is transmitted on at the entry.

FIG. 6 is a flowchart of another example method 600 for wireless communication at an apparatus of a network entity. In an example, a base station 102 can perform the functions described in method 600 using one or more of the components described in FIGS. 1, 2 and 7.

At block 602, the method 600 may transmit a CSI report configuration, to a UE, that includes a report quality parameter set to indicate use of a SINR, the report quantity parameter is configured to trigger the UE to measure the SINR of at least one communication channel associated with the network entity. In some aspects, the communicating component 242, such as in conjunction with processor(s) 212, memory 216, or transceiver 202, may be configured to transmit a CSI report configuration, to a UE, that includes a report quality parameter set to indicate use of a SINR, the report quantity parameter is configured to trigger the UE to measure the SINR of at least one communication channel associated with the network entity. Thus, the base station 102, the processor(s) 212, the communicating component 242 or one of its subcomponents may define the means for transmitting a CSI report configuration, to a UE, that includes a report quality parameter set to indicate use of a SINR, the report quantity parameter is configured to trigger the UE to measure the SINR of at least one communication channel associated with the network entity. For example, to trigger the UE to measure the SINR of a communication channel, the processor 212 of the base station 102 may activate the transceiver 202 and associated RF front end 288 components to transmit a CSI report configuration, to a UE, that includes a report quantity parameter set to indicate use of a SINR.

In some aspects, the report quantity parameter is set to indicate use of a CSI reference signal (RS) resource indicator (CRI) SINR (cri-SINR).

In some aspects, the report quantity parameter may set to indicate use of a synchronization signal block (SSB) index SINR (ssb-Index-SINR).

At block 604, the method 600 may receive a CSI report including an SINR measurement from the UE. In some aspects, the communicating component 242, such as in conjunction with processor(s) 212, memory 216, or transceiver 202, may be configured to receive a CSI report including an SINR measurement from the UE. Thus, the base station 102, the processor(s) 212, the communicating component 242 or one of its subcomponents may define the means for receiving a CSI report including an SINR measurement from the UE. For example, the processor 212 of the base station 102 may activate the transceiver 202 and associated RF front end 288 components to receive a CSI report including an SINR measurement from the UE.

The method 600 may further include transmitting a resource set including a number of configured CSI RS resources from the network entity, wherein the number of configured CSI-RS resources correspond to a value different from two CSI-RS resources, and a range between two configured CSI-RS resources and eight configured CSI-RS resources.

In some aspects, the CSI report is received on the number of configured CSI RS resources each having a port value distinct from a maximum of eight ports or sixteen ports.

In some aspects, the CSI report configuration including the report quantity parameter set to the SINR is associated with a maximum number of 64 configured non-zero-power (NZP) CSI reference signal (RS) resources of an aperiodic resource setting.

In some aspects, the CSI report configuration including the report quantity parameter set to a CSI reference signal (RS) resource indicator SINR (cri-SINR) is associated with configured non-zero-power (NZP) CSI reference signal (RS) resources in a corresponding NZP-CSI-RS resource set for channel measurement and at least one of: an associated CSI interference management (IM) resource in a corresponding csi-IM resource set, or an associated nzp-CSI-RS resources in a corresponding NZP-CSI-RS resource set for interference management.

In some aspects, the CSI report configuration including the report quantity parameter set to a ssb-Index-SINR corresponding to a configured entry of an associated csi-SSB resource list in a corresponding CSI-SSB resource set for channel measurement and at least one of: an associated CSI interference management (IM) resource in a corresponding csi-IM resource set, or an associated nzp-CSI-RS resources in a corresponding NZP-CSI-RS resource set for interference management.

Figure 7:
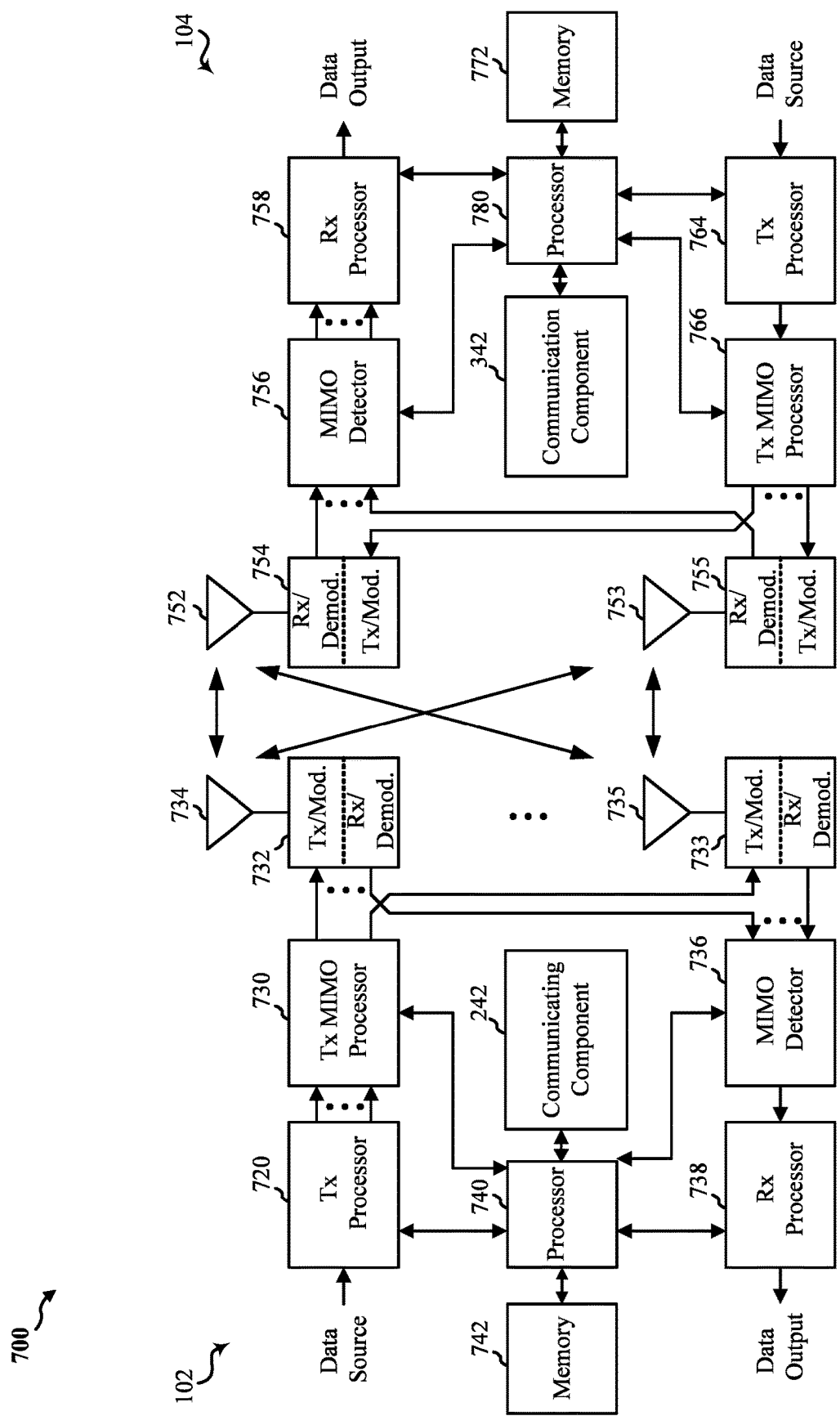
FIG. 7 is a block diagram illustrating an example of a MIMO communication system including a base station and a UE.

FIG. 7 is a block diagram of a MIMO communication system 700 including a base station 102 and a UE 104. The MIMO communication system 700 may be configured to implement the user equipment-aided selective single frequency network techniques described herein. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see such as FIGS. 1 and 2).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

SOME ADDITIONAL EXAMPLES

The aspects described herein additionally include one or more of the following aspect examples described in the following numbered clauses.

1. A method of communications at a user equipment (UE), comprising:
   receiving a channel state information (CSI) report configuration, from a network entity, that includes a report quantity parameter set to indicate use of a signal-to-interference-and-noise ratio (SINR), wherein the report quantity parameter is configured to trigger the UE to measure the SINR of at least one communication channel associated with the network entity;
   obtaining an SINR measurement in response to receiving the CSI report configuration with the report quantity parameter set to indicate use of the SINR; and
   transmitting a CSI report including the SINR measurement to the network entity.

2. The method of clause 1, wherein the report quantity parameter is set to indicate use of a CSI reference signal (RS) resource indicator (CRI) SINR (cri-SINR).

3. The method of any preceding clause, wherein the report quantity parameter is set to indicate use of a synchronization signal block (SSB) index SINR (ssb-Index-SINR).

4. The method of any preceding clause, further comprising:
   receiving a resource set including a number of configured CSI reference signal (RS) resources from the network entity;
   determining that the number of configured CSI-RS resources does not satisfy a port configuration threshold value corresponding to a defined number of configured CSI-RS resources associated with a first port value or a range of configured CSI-RS resources associated with a second port value; and
   forgoing obtaining the SINR measurement based on determining that the number of configured CSI-RS resources does not satisfy the port configuration threshold value,
   wherein each resource of the number of configured CSI-RS resources includes a third port value for transmitting the CSI report based on determining that number of configured CSI-RS resources does not satisfy the port configuration threshold value.

5. The method of any preceding clause, wherein the port configuration threshold value corresponds to one of:
   two CSI-RS resources, or
   the range between two configured CSI-RS resources and eight configured CSI-RS resources.

6. The method of any preceding clause, wherein the first port value corresponds to a maximum of sixteen ports and the second port value corresponds to a maximum of eight ports, the third port value different from the first and second port values.

7. The method of any preceding clause, wherein the CSI report configuration including the report quantity parameter set to a CSI reference signal (RS) resource indicator SINR (cri-SINR) is associated with configured non-zero-power (NZP) CSI reference signal (RS) resources in a corresponding NZP-CSI-RS resource set for channel measurement and at least one of:
   an associated CSI interference management (IM) resource in a corresponding csi-IM resource set, or
   an associated nzp-CSI-RS resources in a corresponding NZP-CSI-RS resource set for interference management.

8. The method of any preceding clause, wherein the CSI report configuration including the report quantity parameter set to a synchronization signal block (SSB) index SINR (ssb-Index-SINR) corresponding to a configured entry of an associated csi-SSB resource list in a corresponding CSI-SSB resource set for channel measurement and at least one of:
   an associated CSI interference management (IM) resource in a corresponding csi-IM resource set, or
   an associated nzp-CSI-RS resources in a corresponding NZP-CSI-RS resource set for interference management.

9. The method of any preceding clause, wherein further comprising determining that a CRI corresponding to an index value is associated with an entry iterated by the index value and another value of a configured set of CSI RS resources for channel or interference measurement, wherein the CSI report including the SINR measurement is transmitted on at the entry.

10. A method of communications at an apparatus of a network entity, comprising:
    transmitting a channel state information (CSI) report configuration, to a user equipment (UE), that includes a report quality parameter set to indicate use of a signal-to-interference-and-noise ratio (SINR), wherein the report quantity parameter is configured to trigger the UE to measure the SINR of at least one communication channel associated with the network entity; and
    receiving a CSI report including an SINR measurement from the UE.

11. The method of clause 10, wherein the report quantity parameter is set to indicate use of a CSI reference signal (RS) resource indicator (CRI) SINR (cri-SINR).

12. The method of any preceding clause, wherein the report quantity parameter is set to indicate use of a synchronization signal block (SSB) index SINR (ssb-Index-SINR).

13. The method of any preceding clause, further comprising transmitting a resource set including a number of configured CSI reference signal (RS) resources from the network entity, wherein the number of configured CSI-RS resources correspond to a value different from:
   two CSI-RS resources, and
   a range between two configured CSI-RS resources and eight configured CSI-RS resources.

14. The method of any preceding clause, wherein the CSI report is received on the number of configured CSI RS resources each having a port value distinct from a maximum of eight ports or sixteen ports.

15. The method of any preceding clause, wherein the CSI report configuration including the report quantity parameter set to a CSI reference signal (RS) resource indicator SINR (cri-SINR) is associated with configured non-zero-power (NZP) CSI reference signal (RS) resources in a corresponding NZP-CSI-RS resource set for channel measurement and at least one of:
   an associated CSI interference management (IM) resource in a corresponding csi-IM resource set, or
   an associated nzp-CSI-RS resources in a corresponding NZP-CSI-RS resource set for interference management.

16. The method of any preceding clause, wherein the CSI report configuration including the report quantity parameter set to a synchronization signal block (SSB) index SINR (ssb-Index-SINR) corresponding to a configured entry of an associated csi-SSB resource list in a corresponding CSI-SSB resource set for channel measurement and at least one of:
   an associated CSI interference management (IM) resource in a corresponding csi-IM resource set, or
   an associated nzp-CSI-RS resources in a corresponding NZP-CSI-RS resource set for interference management.

17. An apparatus for wireless communication, comprising:
   a transceiver;
   a memory configured to store instructions; and
   at least one processor communicatively coupled with the transceiver and the memory, wherein the at least one processor is configured to:
      receive a channel state information (CSI) report configuration, from a network entity, that includes a report quantity parameter set to indicate use of a signal-to-interference-and-noise ratio (SINR), wherein the report quantity parameter is configured to trigger the UE to measure the SINR of at least one communication channel associated with the network entity;
      obtain an SINR measurement in response to receiving the CSI report configuration with the report quantity parameter set to indicate use of the SINR; and
      transmit a CSI report including the SINR measurement to the network entity.

18. The apparatus of clause 17, wherein the report quantity parameter is set to indicate use of a CSI reference signal (RS) resource indicator (CRI) SINR (cri-SINR).

19. The apparatus of any preceding clause, wherein the report quantity parameter is set to indicate use of a synchronization signal block (SSB) index SINR (ssb-Index-SINR).

20. The apparatus of any preceding clause, wherein the at least one processor is further configured to:
   receive a resource set including a number of configured CSI reference signal (RS) resources from the network entity;
   determine that the number of configured CSI-RS resources does not satisfy a port configuration threshold value corresponding to a defined number of configured CSI-RS resources associated with a first port value or a range of configured CSI-RS resources associated with a second port value; and
   forgo obtaining the SINR measurement based on determining that the number of configured CSI-RS resources does not satisfy the port configuration threshold value,
   wherein each resource of the number of configured CSI-RS resources includes a third port value for transmitting the CSI report based on determining that number of configured CSI-RS resources does not satisfy the port configuration threshold value.

21. The apparatus of any preceding clause, wherein the port configuration threshold value corresponds to one of:
   two CSI-RS resources, or
   the range between two configured CSI-RS resources and eight configured CSI-RS resources.

22. The apparatus of any preceding clause, wherein the first port value corresponds to a maximum of sixteen ports and the second port value corresponds to a maximum of eight ports, the third port value different from the first and second port values.

23. The apparatus of any preceding clause, wherein the CSI report configuration including the report quantity parameter set to a CSI reference signal (RS) resource indicator SINR (cri-SINR) is associated with configured non-zero-power (NZP) CSI reference signal (RS) resources in a corresponding NZP-CSI-RS resource set for channel measurement and at least one of:
   an associated CSI interference management (IM) resource in a corresponding csi-IM resource set, or
   an associated nzp-CSI-RS resources in a corresponding NZP-CSI-RS resource set for interference management.

24. The apparatus of any preceding clause, wherein the CSI report configuration including the report quantity parameter set to a synchronization signal block (SSB) index SINR (ssb-Index-SINR) corresponding to a configured entry of an associated csi-SSB resource list in a corresponding CSI-SSB resource set for channel measurement and at least one of:
   an associated CSI interference management (IM) resource in a corresponding csi-IM resource set, or
   an associated nzp-CSI-RS resources in a corresponding NZP-CSI-RS resource set for interference management.

25. The apparatus of any preceding clause, wherein the at least one processor is further configured to determine that a CRI corresponding to an index value is associated with an entry iterated by the index value and another value of a configured set of CSI RS resources for channel or interference measurement, wherein the CSI report including the SINR measurement is transmitted on at the entry.

26. An apparatus for wireless communication, comprising:
   a transceiver;
   a memory configured to store instructions; and
   at least one processor communicatively coupled with the transceiver and the memory, wherein the at least one processor is configured to:
      transmit a channel state information (CSI) report configuration, to a user equipment (UE), that includes a report quality parameter set to indicate use of a signal-to-interference-and-noise ratio (SINR), wherein the report quantity parameter is configured to trigger the UE to measure the SINR of at least one communication channel associated with the network entity; and
      receive a CSI report including an SINR measurement from the UE.

27. The apparatus of clause 26, wherein the report quantity parameter is set to indicate use of a CSI reference signal (RS) resource indicator (CRI) SINR (cri-SINR).

28. The apparatus of any preceding clause, wherein the report quantity parameter is set to indicate use of a synchronization signal block (SSB) index SINR (ssb-Index-SINR).

29. The apparatus of any preceding clause, wherein the CSI report is received on the number of configured CSI RS resources each having a port value distinct from a maximum of eight ports or sixteen ports.

30. The method of any preceding clause, wherein the CSI report configuration including the report quantity parameter set to a CSI reference signal (RS) resource indicator SINR (cri-SINR) is associated with configured non-zero-power (NZP) CSI reference signal (RS) resources in a corresponding NZP-CSI-RS resource set for channel measurement and at least one of:
an associated CSI interference management (IM) resource in a corresponding csi-IM resource set, or
an associated nzp-CSI-RS resources in a corresponding NZP-CSI-RS resource set for interference management.

31. An apparatus for wireless communication, comprising:
means for receiving a channel state information (CSI) report configuration, from a network entity, that includes a report quantity parameter set to indicate use of a signal-to-interference-and-noise ratio (SINR), wherein the report quantity parameter is configured to trigger the UE to measure the SINR of at least one communication channel associated with the network entity;
means for obtaining an SINR measurement in response to receiving the CSI report configuration with the report quantity parameter set to indicate use of the SINR; and
means for transmitting a CSI report including the SINR measurement to the network entity.

32. The apparatus of clause 31, comprising means for performing the operations of one or more methods in claims 1-9.

33. An apparatus for wireless communication, comprising:
means for transmitting a channel state information (CSI) report configuration, to a user equipment (UE), that includes a report quality parameter set to indicate use of a signal-to-interference-and-noise ratio (SINR), wherein the report quantity parameter is configured to trigger the UE to measure the SINR of at least one communication channel associated with the network entity; and
means for receiving a CSI report including an SINR measurement from the UE.

34. The apparatus of clause 33, comprising means for performing the operations of one or more methods in claim 10-16.

35. A non-transitory computer-readable medium, comprising code executable by one or more processors to:
receive a channel state information (CSI) report configuration, from a network entity, that includes a report quantity parameter set to indicate use of a signal-to-interference-and-noise ratio (SINR), wherein the report quantity parameter is configured to trigger the UE to measure the SINR of at least one communication channel associated with the network entity;
obtain an SINR measurement in response to receiving the CSI report configuration with the report quantity parameter set to indicate use of the SINR; and
transmit a CSI report including the SINR measurement to the network entity.

36. The non-transitory computer-readable medium of clause 35, comprising code executable by one or more processors to perform the operations of one or more methods in claim 1-9.

37. A non-transitory computer-readable medium, comprising code executable by one or more processors to:
transmit a channel state information (CSI) report configuration, to a user equipment (UE), that includes a report quality parameter set to indicate use of a signal-to-interference-and-noise ratio (SINR), wherein the report quantity parameter is configured to trigger the UE to measure the SINR of at least one communication channel associated with the network entity; and
receive a CSI report including an SINR measurement from the UE.

38. A non-transitory computer-readable medium of clause 37, comprising code executable by one or more processors to perform the operations of one or more methods in claim 10-16.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of communications at a user equipment (UE), comprising:
   receiving a channel state information (CSI) report configuration, from a network entity, that includes a report quantity parameter set to indicate use of a signal-to-interference-and-noise ratio (SINR), wherein the report quantity parameter is configured to trigger the UE to measure the SINR of at least one communication channel associated with the network entity;
   obtaining an SINR measurement associated with receiving the CSI report configuration with the report quantity parameter set to indicate use of the SINR, wherein the CSI report configuration including the report quantity parameter set to a CSI reference signal (RS) resource indicator SINR (cri-SINR) is associated with a configured non-zero-power (NZP) CSI reference signal (RS) resource in a corresponding NZP-CSI-RS resource set for channel measurement and an associated CSI interference management (IM) resource in a corresponding csi-IM resource set; and
   transmitting a CSI report including the SINR measurement to the network entity.

2. The method of claim 1, wherein the report quantity parameter is set to indicate use of a CSI reference signal (RS) resource indicator (CRI) SINR (cri-SINR).

3. The method of claim 1, wherein the report quantity parameter is set to indicate use of a synchronization signal block (SSB) index SINR (ssb-Index-SINR).

4. The method of claim 1, further comprising:
   receiving a resource set including a number of configured CSI reference signal (RS) resources from the network entity;
   determining that the number of configured CSI-RS resources does not satisfy a port configuration threshold value corresponding to a defined number of configured CSI-RS resources associated with a first port value or a range of configured CSI-RS resources associated with a second port value; and
   forgoing obtaining the SINR measurement based on determining that the number of configured CSI-RS resources does not satisfy the port configuration threshold value,
   wherein each resource of the number of configured CSI-RS resources includes a third port value for transmitting the CSI report based on determining that number of configured CSI-RS resources does not satisfy the port configuration threshold value.

5. The method of claim 4, wherein the port configuration threshold value corresponds to one of:
   two CSI-RS resources, or
   the range between two configured CSI-RS resources and eight configured CSI-RS resources.

6. The method of claim 4, wherein the first port value corresponds to a maximum of sixteen ports and the second port value corresponds to a maximum of eight ports, the third port value different from the first and second port values.

7. The method of claim 1, wherein the CSI report configuration is further associated with:
   an associated CSI interference management (IM) resource in a corresponding csi-IM resource set.

8. The method of claim 1, wherein the CSI report configuration including the report quantity parameter set to a synchronization signal block (SSB) index SINR (ssb-Index-SINR) corresponding to a configured entry of an associated csi-SSB resource list in a corresponding CSI-SSB resource set for channel measurement and at least one of:
- an associated CSI interference management (IM) resource in a corresponding csi-IM resource set, or
- an associated nzp-CSI-RS resources in a corresponding NZP-CSI-RS resource set for interference management.

9. The method of claim 1, wherein further comprising determining that a CRI corresponding to an index value is associated with an entry iterated by the index value and another value of a configured set of CSI RS resources for channel or interference measurement, wherein the CSI report including the SINR measurement is transmitted on at the entry.

10. A method of communications at an apparatus of a network entity, comprising:
- transmitting a channel state information (C SI) report configuration, to a user equipment (UE), that includes a report quantity parameter set to indicate use of a signal-to-interference-and-noise ratio (SINR), wherein the report quantity parameter is configured to trigger the UE to measure the SINR of at least one communication channel associated with the network entity, wherein the CSI report configuration including the report quantity parameter set to a CSI reference signal (RS) resource indicator SINR (cri-SINR) is associated with a configured non-zero-power (NZP) CSI reference signal (RS) resource in a corresponding NZP-CSI-RS resource set for channel measurement and an associated CSI interference management (IM) resource in a corresponding csi-IM resource set; and
- receiving a CSI report including an SINR measurement from the UE.

11. The method of claim 10, wherein the report quantity parameter is set to indicate use of a CSI reference signal (RS) resource indicator (CRI) SINR (cri-SINR).

12. The method of claim 10, wherein the report quantity parameter is set to indicate use of a synchronization signal block (SSB) index SINR (ssb-Index-SINR).

13. The method of claim 10, further comprising transmitting a resource set including a number of configured CSI reference signal (RS) resources from the network entity, wherein the number of configured CSI-RS resources correspond to a value different from:
- two CSI-RS resources, and
- a range between two configured CSI-RS resources and eight configured CSI-RS resources.

14. The method of claim 13, wherein the CSI report is received on the number of configured CSI RS resources each having a port value distinct from a maximum of eight ports or sixteen ports.

15. The method of claim 10, wherein the CSI report configuration including the report quantity parameter is further associated with
- an associated CSI interference management (IM) resource in a corresponding csi-IM resource set.

16. The method of claim 10, wherein the CSI report configuration including the report quantity parameter set to a synchronization signal block (SSB) index SINR (ssb-Index-SINR) corresponding to a configured entry of an associated csi-SSB resource list in a corresponding CSI-SSB resource set for channel measurement and at least one of:
- an associated CSI interference management (IM) resource in a corresponding csi-IM resource set, or
- an associated nzp-CSI-RS resources in a corresponding NZP-CSI-RS resource set for interference management.

17. An apparatus for wireless communication, comprising:
- a transceiver;
- a memory configured to store instructions; and
- at least one processor communicatively coupled with the transceiver and the memory, wherein the at least one processor is configured to:
  - receive a channel state information (CSI) report configuration, from a network entity, that includes a report quantity parameter set to indicate use of a signal-to-interference-and-noise ratio (SINR), wherein the report quantity parameter is configured to trigger a measurement of the SINR of at least one communication channel associated with the network entity;
  - obtain an SINR measurement associated with receiving the CSI report configuration with the report quantity parameter set to indicate use of the SINR, wherein the CSI report configuration including the report quantity parameter set to a CSI reference signal (RS) resource indicator SINR (cri-SINR) is associated with a configured non-zero-power (NZP) CSI reference signal (RS) resource in a corresponding NZP-CSI-RS resource set for channel measurement and an associated CSI interference management (IM) resource in a corresponding csi-IM resource set; and
  - transmit a CSI report including the SINR measurement to the network entity.

18. The apparatus of claim 17, wherein the report quantity parameter is set to indicate use of a CSI reference signal (RS) resource indicator (CRI) SINR (cri-SINR).

19. The apparatus of claim 17, wherein the report quantity parameter is set to indicate use of a synchronization signal block (SSB) index SINR (ssb-Index-SINR).

20. The apparatus of claim 17, wherein the at least one processor is further configured to:
- receive a resource set including a number of configured CSI reference signal (RS) resources from the network entity;
- determine that the number of configured CSI-RS resources does not satisfy a port configuration threshold value corresponding to a defined number of configured CSI-RS resources associated with a first port value or a range of configured CSI-RS resources associated with a second port value; and
- forgo obtaining the SINR measurement based on determining that the number of configured CSI-RS resources does not satisfy the port configuration threshold value, wherein each resource of the number of configured CSI-RS resources includes a third port value for transmitting the CSI report based on determining that number of configured CSI-RS resources does not satisfy the port configuration threshold value.

21. The apparatus of claim 20, wherein the port configuration threshold value corresponds to one of:
- two CSI-RS resources, or
- the range between two configured CSI-RS resources and eight configured CSI-RS resources.

22. The apparatus of claim 20, wherein the first port value corresponds to a maximum of sixteen ports and the second port value corresponds to a maximum of eight ports, the third port value different from the first and second port values.

23. The apparatus of claim 17, wherein the CSI report configuration including the report quantity parameter is further associated with
an associated CSI interference management (IM) resource in a corresponding csi-IM resource set.

24. The apparatus of claim 17, wherein the CSI report configuration including the report quantity parameter set to a synchronization signal block (SSB) index SINR (ssb-Index-SINR) corresponding to a configured entry of an associated csi-SSB resource list in a corresponding CSI-SSB resource set for channel measurement and at least one of:
an associated CSI interference management (IM) resource in a corresponding csi-IM resource set, or
an associated nzp-CSI-RS resources in a corresponding NZP-CSI-RS resource set for interference management.

25. The apparatus of claim 17, wherein the at least one processor is further configured to determine that a CRI corresponding to an index value is associated with an entry iterated by the index value and another value of a configured set of CSI RS resources for channel or interference measurement, wherein the CSI report including the SINR measurement is transmitted on at the entry.

26. An apparatus for wireless communication, comprising:
a transceiver;
a memory configured to store instructions; and
at least one processor communicatively coupled with the transceiver and the memory, wherein the at least one processor is configured to:
transmit a channel state information (CSI) report configuration, to a user equipment (UE), that includes a report quantity parameter set to indicate use of a signal-to-interference-and-noise ratio (SINR), wherein the report quantity parameter is configured to trigger the UE to measure the SINR of at least one communication channel, wherein the CSI report configuration including the report quantity parameter set to a CSI reference signal (RS) resource indicator SINR (cri-SINR) is associated with a configured non-zero-power (NZP) CSI reference signal (RS) resource in a corresponding NZP-CSI-RS resource set for channel measurement and an associated CSI interference management (IM) resource in a corresponding csi-IM resource set; and
receive a CSI report including an SINR measurement from the UE.

27. The apparatus of claim 26, wherein the report quantity parameter is set to indicate use of a CSI reference signal (RS) resource indicator (CRI) SINR (cri-SINR).

28. The apparatus of claim 26, wherein the report quantity parameter is set to indicate use of a synchronization signal block (SSB) index SINR (ssb-Index-SINR).

29. The apparatus of claim 26, wherein the CSI report configuration including the report quantity parameter is further associated with
an associated CSI interference management (IM) resource in a corresponding csi-IM resource set.

30. The apparatus of claim 26, wherein the CSI report configuration including the report quantity parameter set to a synchronization signal block (SSB) index SINR (ssb-Index-SINR) corresponding to a configured entry of an associated csi-SSB resource list in a corresponding CSI-SSB resource set for channel measurement and at least one of:
an associated CSI interference management (IM) resource in a corresponding csi-IM resource set, or
an associated nzp-CSI-RS resources in a corresponding NZP-CSI-RS resource set for interference management.

* * * * *